United States Patent [19]

Kitahara

[11] Patent Number: 5,689,673
[45] Date of Patent: Nov. 18, 1997

[54] APPARATUS AND METHOD FOR CONTROLLING INSTRUCTION FLOW BY USING A MATRIX OF TRANSMISSION GATES IN SUPER-SCALER MICROPROCESSOR AND SELECTIVELY DELAYING MICROPROCESSOR INSTRUCTION EXECUTION BASED ON RESOURCE AVAILABILITY

[75] Inventor: Takeshi Kitahara, Santa Clara, Calif.

[73] Assignee: Hal Computer Systems, Inc., Campbell, Calif.

[21] Appl. No.: 388,602

[22] Filed: Feb. 14, 1995

[51] Int. Cl.[6] .............................. G06F 13/14; G06F 9/22; G06F 9/30
[52] U.S. Cl. ..................... 395/391; 395/393; 395/591; 395/729; 395/731; 364/228.7; 364/263.3; 364/265.6; 377/69; 377/77
[58] Field of Search ..................... 395/800, 375, 395/391, 393, 500, 591, 728, 729, 730, 731, 732; 364/200, 228.3, 228.7, 231.8, 262.8, 263.3, 265.6; 377/77, 64, 69, 73

[56] References Cited

U.S. PATENT DOCUMENTS

| | | | |
|---|---|---|---|
| 4,903,196 | 2/1990 | Pomerene et al. ................. | 395/391 |
| 4,942,525 | 7/1990 | Shintani et al. ................... | 395/393 |
| 5,008,905 | 4/1991 | Lee et al. ........................... | 377/77 |
| 5,239,651 | 8/1993 | Sodos ................................. | 395/729 |
| 5,299,318 | 3/1994 | Beamard et al. ................... | 395/500 |
| 5,341,482 | 8/1994 | Cutler et al. ....................... | 395/591 |
| 5,418,967 | 5/1995 | Simcoe et al. ..................... | 395/729 |
| 5,530,816 | 6/1996 | Holt ................................... | 395/391 |

Primary Examiner—Parshotam S. Lall
Assistant Examiner—Bharat Barot
Attorney, Agent, or Firm—Albert C. Smith, of Fenwick & West LLP

[57] ABSTRACT

An instruction flow control circuit controls the selection and execution of instruction signals in a microprocessor having multiple execution units that can execute plural instructions at one time. The instruction flow control circuit compares a number of signals indicating how many execution units are available with a number of signals indicating how many execution units are required. The circuit is a matrix of transmission gates which propagate signals through, or shift signals between, various signal paths for available resources, depending on the signals requesting the executing units. A number of output gates suppress the execution of instruction signals where an execution unit is requested but none are available.

9 Claims, 7 Drawing Sheets

APPARATUS AND METHOD FOR CONTROLLING INSTRUCTION FLOW BY USING A MATRIX OF TRANSMISSION GATES IN SUPER-SCALER MICROPROCESSOR AND SELECTIVELY DELAYING MICROPROCESSOR INSTRUCTION EXECUTION BASED ON RESOURCE AVAILABILITY

RELATED APPLICATIONS

The subject matter of this application is related to the subject matter of application Ser. No. 08/388,389 entitled "Addressing Method for Executing Load Instructions Out of Order with Respect to Store Instructions," filed on Feb. 14, 1995 by Michael Simone and Michael Shebanow, now abandoned, application Ser. No. 08/388,606 entitled "Method and Apparatus for Efficiently Writing Results to Renamed Registers" filed on Feb. 14, 1995 by DeForest Tovey, Michael Shebanow and John Gmuender now abandoned, application Ser. No. 08/388,364 entitled "Method and Apparatus for Coordinating the Use of Physical Registers in a Microprocessor" fled on Feb. 14, 1995 by DeForest Tovey, Michael Shebanow and John Gmuender now abandoned, application Ser. No. 08/390,885 entitled "Processor Structure and Method for Tracking Instruction Status to Maintain Precise State" filed on Feb. 14, 1995 by Gene W. Shen, John Szeto, Niteen A. Patkar and Michael C. Shebanow now abandoned.

BACKGROUND

1. Field of the Invention

The present invention is related to methods and apparatuses for controlling instruction flow in super-scaler microprocessors, and more particularly, to methods and apparatuses for selectively delaying microprocessor instruction execution based on resource availability.

2. Background of the Invention

Many current microprocessors are able to execute multiple instructions at one time using many sets of execution units, particularly through the use of pipelining and data flow architecture. Pipelined computers allow multiple instructions to be in various stages of execution simultaneously. Dataflow computers use multiple instruction execution units and execute operations on available data. Additionally, microprocessor clock speeds are becoming increasingly faster, with many microprocessors operating in excess of 100 MHz. In microprocessors employing these attributes, controlling instruction flow inside the microprocessor is very important to achieve the highest possible performance. In particular, it is necessary to control the flow of instructions to the execution units where multiple instructions are available for execution and the execution units are in various states of availability. Maximizing performance requires determining which instructions are executable, which execution units are available, and minimizing the delay in passing the executable instructions to available execution units.

Figures 1, 1B:
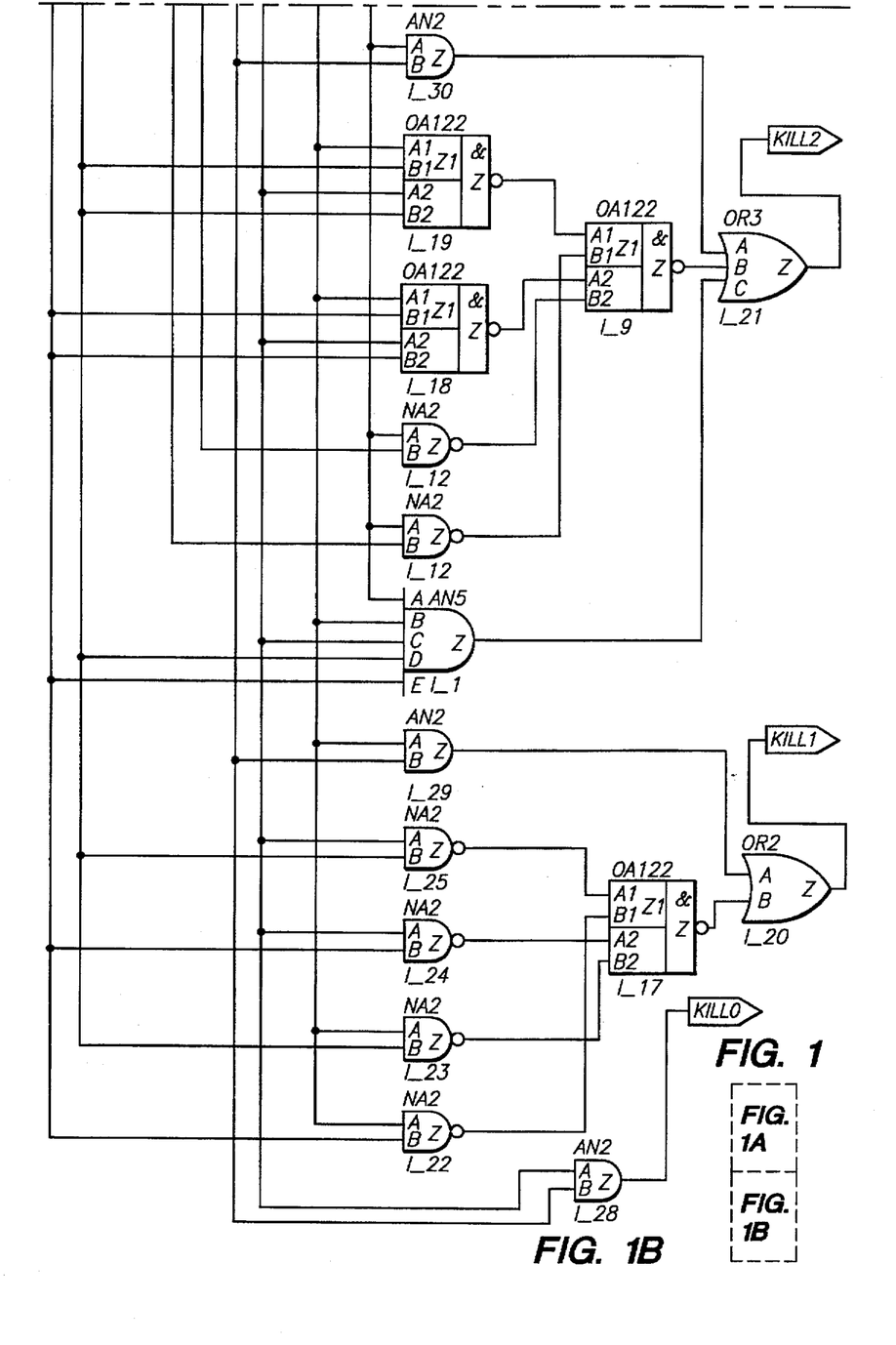
FIG. 1, 1A, and 1B show a schematic of a prior art instruction flow control circuit.
Figure 1A:
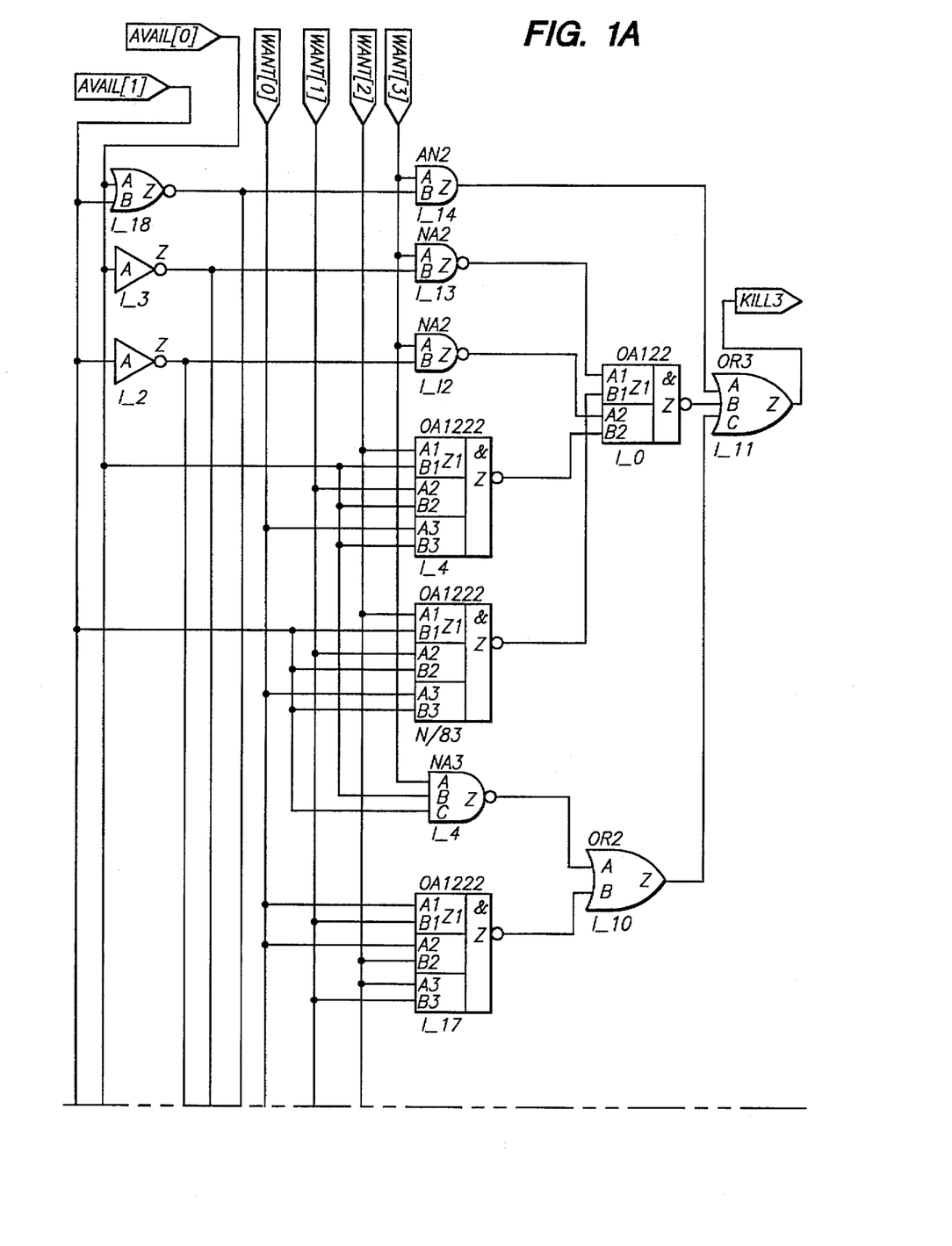

Conventional instruction flow control circuits process requests for execution using numerous stages of multi-input AND and NOR gates. This results in significant circuit delays due to gate fanout, even where only a limited number of instructions and resources (execution units) are being handled. For example, FIG. 1 shows a prior art embodiment of an instruction flow control circuit for controlling the flow of four instruction requests among two execution units. This implementation includes 186 transistors. The heaviest input load is 11 gates on the AVAIL[0] signal. A heavy and unbalanced input load increases the delay time of the circuit. In addition, many of the gates have multiple inputs, resulting in longer execution times. These various problems result in inefficient allocation of available execution units, and lower overall performance for the microprocessor.

Accordingly, it is desirable to provide an improved instruction flow control circuit that reduces the number of multi-input gates, and the load requirements of the input signals, and further provides for efficient and rapid allocation of execution units.

SUMMARY OF THE INVENTION

The present invention provides a high performance circuit for controlling the instruction flow inside a super-scaler microprocessor having two or more execution units. The instruction flow control circuit uses a matrix of transmission gates having two sets of inputs: a set of resource request signals associated with instructions requesting execution, and a set of resource availability signals from a set of execution units indicating availability. The circuit propagates the resource availability signals through a number of stages, allocating in each stage an available execution unit to one requesting signal, and reducing the available resources available in the next stage. Where there is no resource available in a stage, the circuit suppresses the execution of an instruction signal associated with the resource request signal.

Execution units are made available through a primary signal path which runs through the stages, propogating the resource availibility signals where an resource request signal is not asserted. One or more secondary signal paths, also running through the stages, contain the resource availability signals for other execution units. These signals are shifted from the secondary to the primary signal path each time an a resource request signal is asserted and an execution unit is allocated. This shifting reduces the number of available execution units in the next stage.

DETAILED DESCRIPTION OF THE INVENTION

Figure 2:
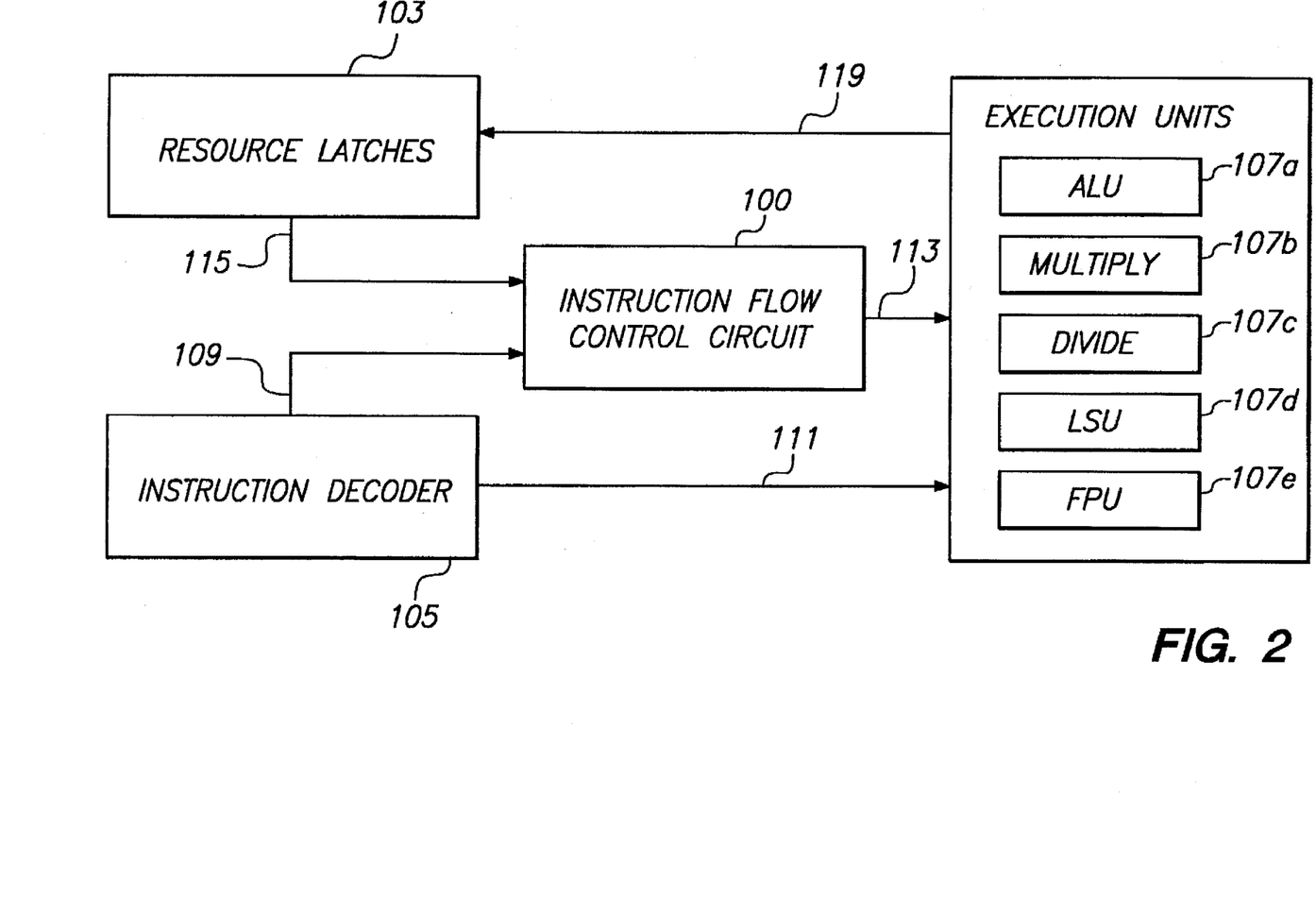
FIG. 2 is block diagram of a portion of a microprocessor using the instruction flow control circuit of the present invention.

Referring now to FIG. 2, there is shown a block diagram of a portion of a pipelined microprocessor incorporating the instruction flow control circuit of the present invention. An instruction decoder 105 receives fetched instruction codes and data in a conventional manner from instruction caches, buffers, or the like. The instruction decoder 105 decodes each instruction code to determine the instruction signal 111 to be executed, and the execution unit 107, such as ALU 107a, multiplier 107b, divider 107c, load-store unit 107d, or floating point unit 107e, to be employed. The instruction decoder 105 forwards a number of resource request signals 109 to instruction flow control circuit 100 indicating whether an execution unit 107 is needed for each instruction signal 111. In one preferred embodiment there are four resource request signals 109 for four cycle pipelining in the execution units 107 of the instruction signals 111. The instruction decoder 105 sends the instruction signals 111 to the execution units 107 for execution.

The instruction flow control circuit 100 also receives resource availability signals 115 from a number of resource latches 103. The resource availability signals 115 indicate which execution units 107 will be available at the next execution cycle. The resource latches 103 are updated as to the availability of the execution units 107 via update signals 119. The instruction flow control circuit 100 compares the resource request signals 109 to the resource availability signals 115. When an execution unit 107 is available and an instruction signal 111 requires the execution unit 107, the instruction flow control circuit 100 allows the execution unit 107 to execute the instruction signal 111. Otherwise, the instruction flow control circuit 100 supresses the execution of the signal with an asserted suppression signal 113. This is preferrably done by suppressing the highest order instruction signals 111 first.

Figure 3:
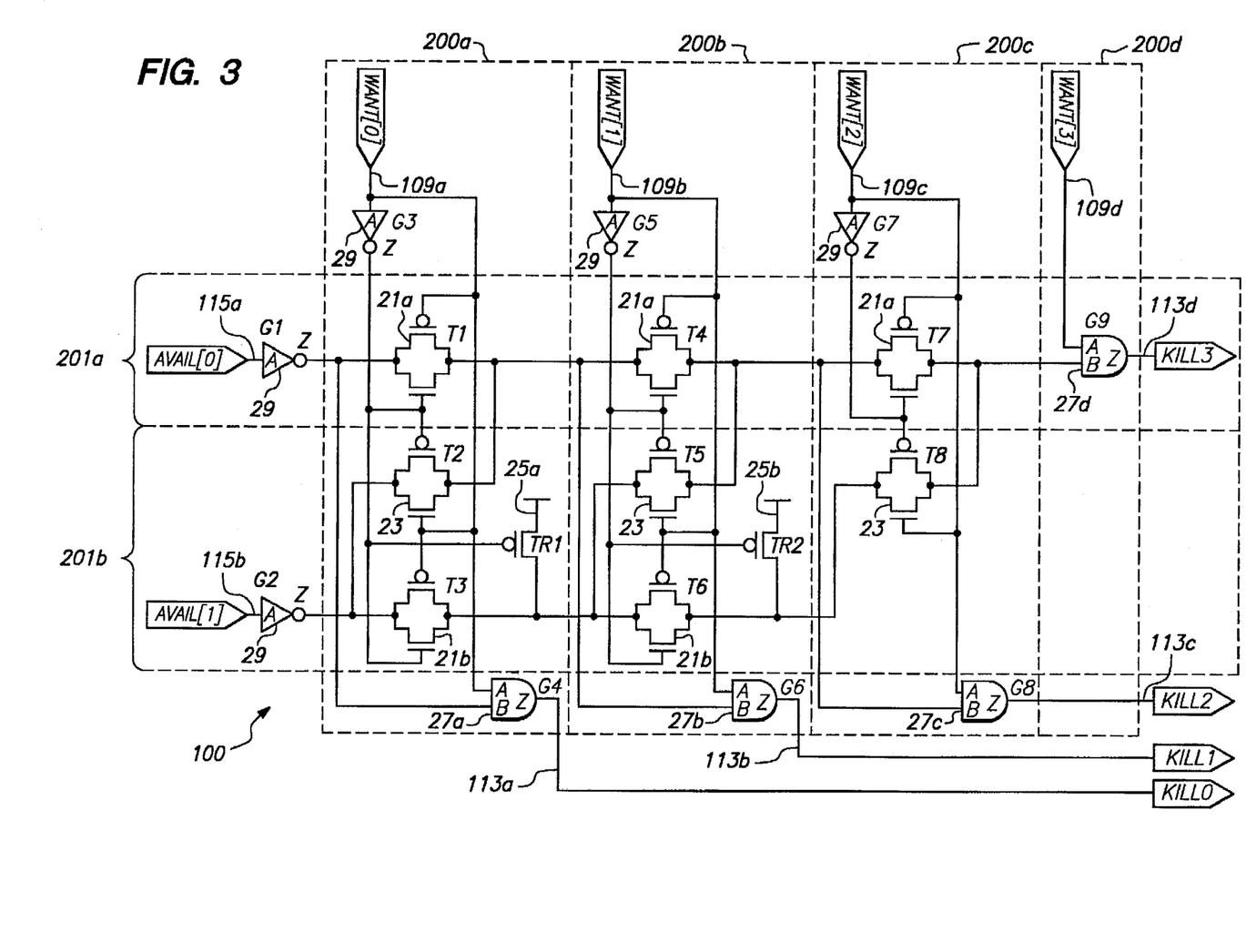
FIG. 3 is a schematic of a basic embodiment of the instruction now control circuit.

Referring now to FIG. 3, there is shown a schematic of one embodiment of the instruction flow control circuit 100. Circuit 100 includes a number of stages 200 for comparing the resource request signals 109 with the resource availability signals 115, to generate a suppression signal 113 in response thereto. An asserted suppression signal 113 blocks execution of the instruction signal 111 associated with the asserted resource request signal 109. A negated suppression signal 113 allows execution of the instruction signal 111 by an execution unit 107 capable of handling the instruction signal.

Through each stage 200 runs signal paths 201 for the resource availability signals 115. There is one signal path 201 for each of the execution units 107 being controlled. The signal paths receive as inputs the resource availability signals 115, which are inverted by inverters 29.

A primary signal path 201a carries a resource availability signal 115a indicating whether an execution unit 107 is available. After inversion by inverter 29, a low indicates an available resource, a high, an unavailable resource. The primary signal bath 201a is coupled to a set of AND gates 27. There is one AND gate 27 in each stage 200. Each AND gate 27 outputs a suppression signal 113 for controlling the resource request signal 109 input into the stage 200. The AND gate 27 will assert the suppression signal 113 when the resource availability signal 115 in the primary signal path 201a and the resource request signal 109 entering the stage 200 are asserted. Thus, if an execution unit 107 is available to execute an instruction signal 111 associated with the resource request signal 109, then the AND gate 27 will produce a low, thereby not asserting a suppression signal 113.

In the primary signal path 201a there is a propagating gate 21 in each stage 200 which receives complementary inputs from the resource request signal 109 input into the stage 200. The propagating gate 21 will pass the logic level of the resource availability signal 115 in the primary signal path 201a when the resource request signal 109 is negated. This makes the execution unit 107 available to the next stage. In each stage, the combination of the resource availability signal 115 and the resource request signal 109 controls whether the execution unit 107 is available to the next stage 200. The secondary signal paths 201 also include propagating gates 21. The propagating gates 21 pass the resource availability signal 109 in that secondary signal path when the resource request signal 109 is negated.

Coupling the primary and secondary signal paths 201 is one shifting gate 23 in all but the last stages 200. Each shifting gate 23 is disposed in series between the propagating gates 21 of the signal paths, and connects the signal paths in parallel. In the preferred embodiment, the gates 21, 23 are CMOS transmission gates. The shifting gates 23 also receive complementary inputs from the resource request signals 109. However, the shifting gates 23 are open when the resource request signal 109 is asserted. In this case, the shifting gates 23 transfer the logic level of the resource availability signal 115 from the secondary signal path 201b to the primary signal path 201a. If the resource availability signal 115b in the secondary signal path 201b is high (indicating no execution unit available), and the resource request signal 109a in a first stage 200a consumes the execution unit 107 represented by the primary signal path 201a, then the shifting gate 23 in the first stage 200a will shift the high signal to the primary signal path 201a in the next stage 200b. If the resource request signal 109b in that stage 200b is asserted, then the AND gate 27b in that stage will assert the suppression signal 113b. This is the correct result, since no execution units 107 were available to service the instruction signal 111.

Coupled to the output of the each propagating gate 21 in the secondary signal path 201b is a pull up transistor 25. This transistor 25 pulls the logic level in secondary signal path 201b high when the resource request signal 109 input into the stage 200 is asserted, otherwise the logic level in the secondary signal path 201b is low. This has the effect of setting up the next stage to receive the correct signal values in the secondary signal path 201b and the shifting gates 23.

Table 1 shows a truth table for suppression signals 113 to the execution units 107 according to the relationship of the resource availability signals 115, here nominated AVAIL[1, 0], and the resource request signals 109, here nominated WANT[3,2,1,0]. Table 1 is configured for two execution units 107, which is a minimum number for instruction flow control for four instructions signals 111. In Table 1, the resource availability signals 115, AVAIL[1,0], are interpreted as follows: [0,0] indicates that no execution units 107, are available in the next cycle; [0,1] indicates that one execution unit is available; and [1,1] indicates that both execution units 107 are available.

TABLE 1

Suppression Signal Truth Table

| AVAIL[1,0] | | WANT[3,2,1,0] | | | | | | | |
| --- | --- | --- | --- | --- | --- | --- | --- | --- | --- |
| [1] | [0] | (0000) | (0001) | (0010) | (0011) | (0100) | (0101) | (0110) | (0111) |
| 0 | 0 | (0000) | (0001) | (0010) | (0011) | (0100) | (0101) | (0110) | (0111) |
| 0 | 1 | (0000) | (0000) | (0000) | (0010) | (0000) | (0100) | (0100) | (0110) |
| 1 | 1 | (0000) | (0000) | (0000) | (0000) | (0000) | (0000) | (0000) | (0100) |

| AVAIL[1,0] | | WANT[3,2,1,0] | | | | | | | |
| --- | --- | --- | --- | --- | --- | --- | --- | --- | --- |
| [1] | [0] | (1000) | (1001) | (1010) | (1011) | (1100) | (1101) | (1110) | (1111) |
| 0 | 0 | (1000) | (1001) | (1010) | (1011) | (1100) | (1101) | (1110) | (1111) |
| 0 | 1 | (0000) | (1000) | (1000) | (1010) | (1000) | (1100) | (1100) | (1110) |
| 1 | 1 | (0000) | (0000) | (0000) | (1000) | (0000) | (1000) | (1000) | (1100) |

An example of the operation of the instruction flow control circuit 100 is as follows:

Assume that two execution units 107 are available, hence resource availability signals 115a,b are asserted. Further assume that three resources are requested, hence resource request signals 109a,c, and d, are asserted. This situation corresponds to the double bordered cell in Table 1.

In the first stage 200a, the resource request signal 109a and the inverted resource availability signal 115a are input into AND gate 27a. Since the resource request signal 109a is asserted, and the resource availability signal 115a is negated, the AND gate 27a outputs a negated suppression signal 113a. The negated suppression signal 113a allows execution of the instruction signal 111 associated with the resource request signal 109a. Propagating gates 21a and 21b in the primary and secondary signal paths 201 will be closed because the resource request signal 109a is asserted. Shifting gate 23 will open, shifting the logic level (low) from the secondary signal path 201b to the primary signal path 201a. Also, because resource request signal 109a is asserted, transistor 25a will pull up the logic level in the secondary signal path 201b, passing the logic level to the shifting gate 23 in the next stage 200b. As a result of these two shifts, there will be represented in the signal paths one less available resource, (0,1) in the next stage 200b. The remaining available resource is in the primary signal path 201a, having been shifted from the secondary signal path 201b.

In the next stage 200b, the input resource request signal 109b is negated, indicating that an execution unit 107 is not needed here. Accordingly, propagating gates 21a,b in this stage 200b open, passing the logic levels in the signal paths (0,1) to the next stage 200c. AND gate 27b will negate the suppression signal 113b, but since there is no instruction signal 111 to execute, no execution unit 107 is consumed. Because the resource request signal 109b is asserted into transistor 25b, there is no change in the logic level entering the shifting gate 23 in the third stage 200c.

In the third stage 200c, the resource request signal 109c is asserted into AND gate 27c, which also receives the negated resource availability signal 115 in the primary signal path 201a. This negates the suppression signal 113c. Since one resource remains, this resource is allocated to the instruction signal 111, and the AND gate 27c does not block execution. The propagating gate 21a in the primary signal path 201a closes, but the shifting gate 23 opens, passing the asserted resource availability signal 115 to the last stage 200d.

In the last stage 200d, and AND gate 27d receives both an asserted resource availability signal 115 in the primary signal path 201a, indicating no resource available, and an asserted resource request signal 109d, requesting an execution unit 107. Since all the execution units 107 have already been allocated, the AND gate 27d asserts a suppression signal 113d because there is no resource available.

Figure 4:
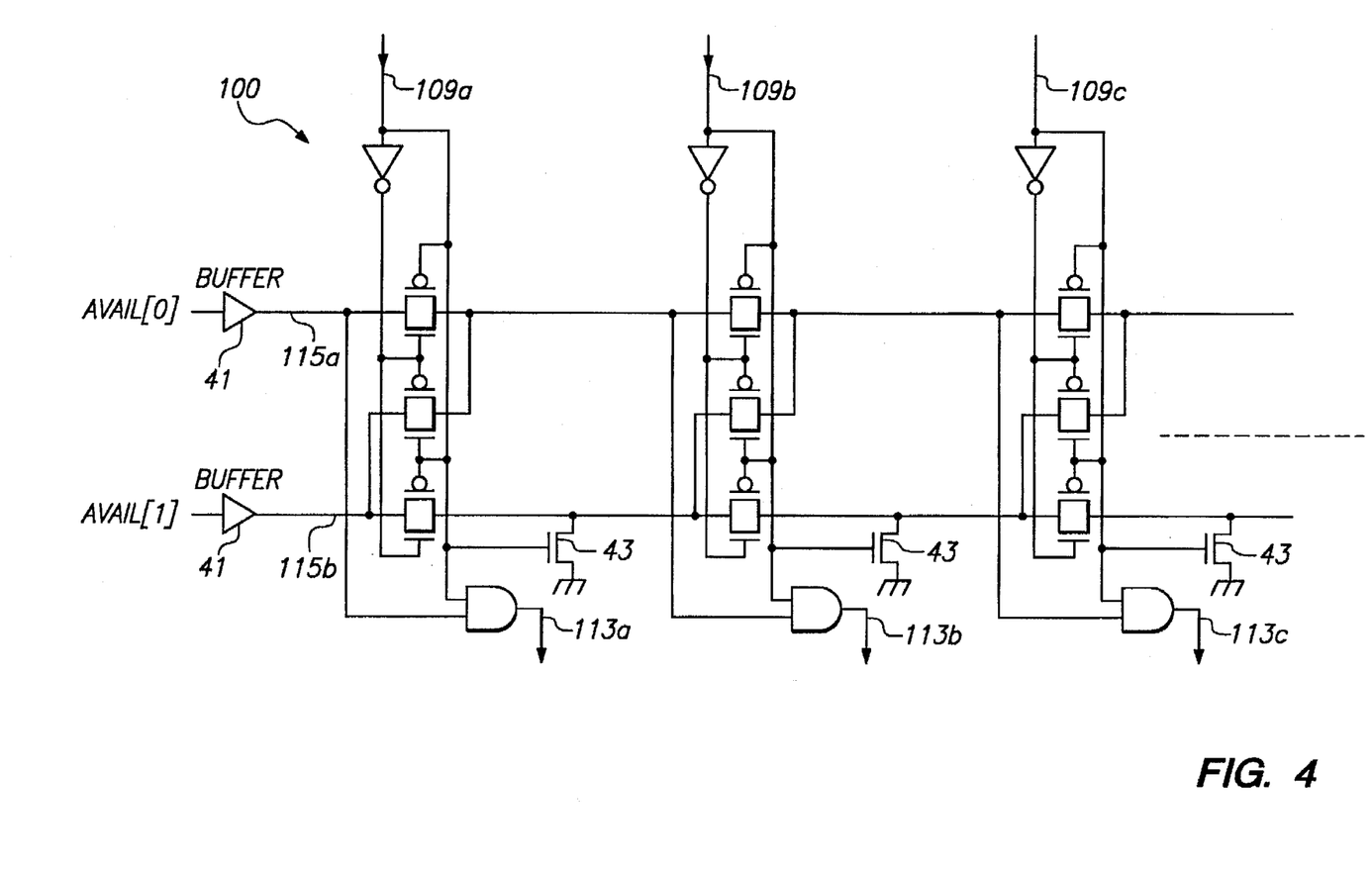
FIG. 4 is a schematic of an alternate embodiment of the instruction now control circuit.

FIG. 4 shows a portion of an alternate embodiment of the instruction flow control circuit 100. Here the inverters 29a and 29b are be replaced by buffers 41, and the pull up transistors 25 may be replaced by a pull down transistor 43. As a result, the circuit 100 indicates which resource request signal 115 to allow, rather than to suppress. Where each resource request signal 115 is associated with a particular type of execution unit 107, this would indicate which execution unit 107 to allow to execute. In this embodiment, the instruction flow control circuit 100 includes just 52 transistors. Alternatively, another embodiment, similar to that shown in FIG. 4, can be used to suppress execution by replacing the AND gates 27 with NOR gates.

Figure 5:
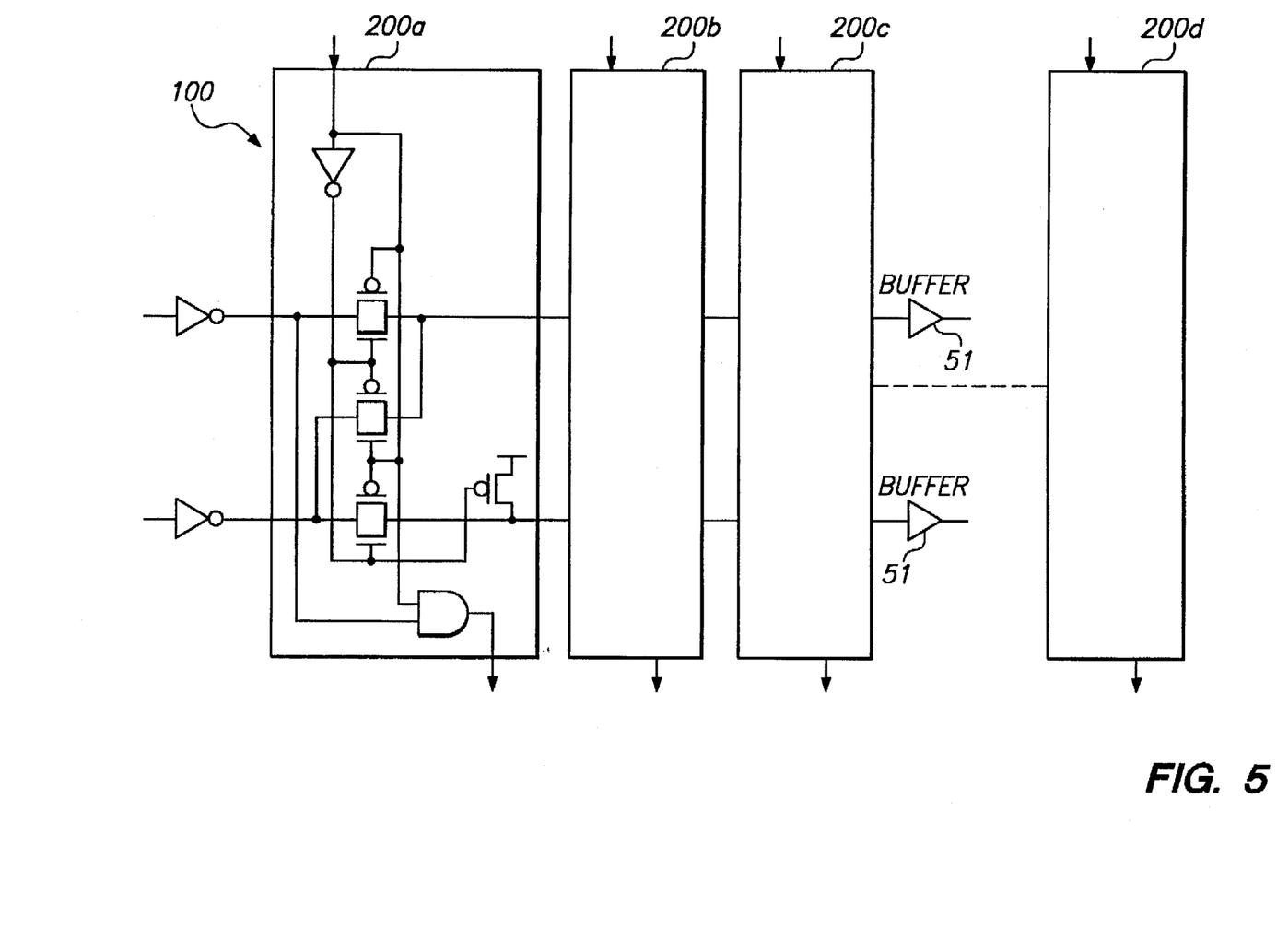
FIG. 5 is an illustration of the instruction flow control circuit with additional stages for handing a larger number of resource request signals.
Figure 6:
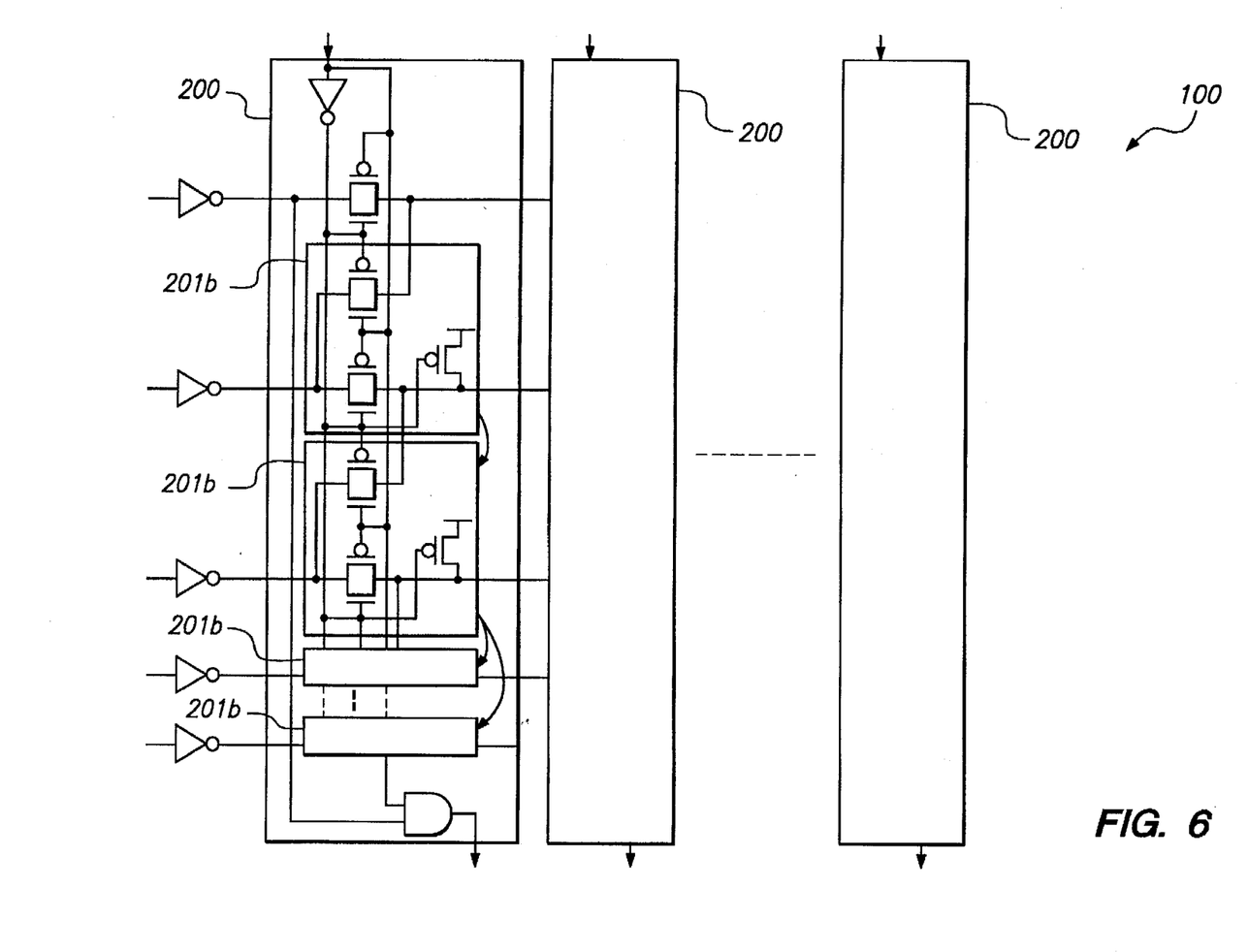
FIG. 6 is an illustration of the instruction flow control circuit with additional secondary signal paths for handling a larger number of resource availabity signals.

The instruction flow control circuit 100 can be generalized to handle a larger number of execution units 107 and available instructions signals 111, by scaling the circuit 100 horizontally and vertically with certain buffers to accommodate additional resource request signals 115 and resource availability signals 109. FIG. 5 shows a schematic illustration of horizontal scaling the circuit 100 by coupling additional stages 200. Buffers 51 are placed between every third and fourth stage 200, or as otherwise useful. FIG. 6 shows a schematic illustration of vertical scaling by coupling additional secondary signal paths 201b in each stage 200, and again generally illustrates the use of additional stages 200.

I claim:

1. An apparatus including an instruction flow control circuit, comprising:

a primary signal path including a plurality of propagating gates, each propagating gate receiving complementary inputs from one of a plurality of resource request signals, each propagating gate propagating a resource availability signal in the primary signal path where the resource request signal input into the propagating gate does not request a resource;

at least one secondary signal path including a plurality of propagating gates, each propagating gate receiving complementary inputs from one of the plurality of resource request signals, each propagating gate propagating a resource availability signal in the secondary signal path where the resource request signal input into the propagating gate does not request a resource;

a shifting gate coupled between selected pairs of propagating gates in selected pairs of signal paths, each shifting gate receiving complementary inputs from the same resource request signal providing inputs to the pair of propagating gates, and shifting the resource availability signal in one of the signal paths to the other signal path where the resource request signal requests a resource;

a transistor coupled after each propagating gate in each secondary signal path, and receiving an input from the same resource request signal providing inputs to the propagating gate in the secondary signal path, the transistor changing a logic level in the secondary signal path coupled thereto where the resource request signal requests a resource; and a plurality of comparing gates, each comparing gate coupled to the primary signal path to receive a resource availability signal, and further coupled to receive a selected one of the resource request signals, for comparing the signals and producing in response thereto a suppression signal.

2. The apparatus of claim 1, further comprising:

a plurality of execution units coupled to the instruction flow control circuit for receiving the suppression signals;

an instruction decoder coupled to the plurality of execution units to provide thereto a plurality of instruction signals for execution, and further coupled to the instruction flow control circuit to provide thereto a plurality of resource request signals, each resource request signal corresponding to one of the instruction signals, and the instruction flow control circuit producing a suppression signal corresponding to a resource request signal for controlling execution of the instruction signal to which the resource request signal corresponds in response to an availability of an execution unit to execute that instruction signal; and resource control circuit coupled to the plurality of execution units to receive at least one signal indicating the number or identity of available execution units, the resource control circuit further coupled to the instruction flow control circuit to provide thereto the plurality of resource availability signals indicative of the availability of the execution units.

3. The instruction flow control circuit of claim 1, wherein each propagating gate and each shifting gate is a CMOS transmission gate.

4. The instruction flow control circuit of claim 1, further comprising an inverter coupled to each resource request signal and each resource availability signal.

5. The instruction flow control circuit of claim 1, wherein each comparing gate is an AND gate.

6. The instruction flow control circuit of claim 5, wherein each transistor is a pull-up transistor.

7. The instruction flow control circuit of claim 5, wherein each transistor is a pull-down transistor.

8. The instruction flow control circuit of claim 1, wherein each comparing gate is an NOR gate.

9. A method of controlling the flow of execution for a plurality of instructions, comprising the steps of:

receiving a plurality of resource request signals, each resource request signal associated with an instruction signal requiring execution by an execution unit;

receiving a lesser plurality of resource availability signals indicating a number of available execution units;

comparing a selected one of the resource request signals to each of the resource availability signals, and either:
allocating an execution unit to the instruction signal associated with the resource request signal, and altering one of the resource availability signals to reduce the number of available execution units, where at least one execution unit is available; or
suppressing the instruction signal associated with the resource request signal where no execution units are available; and repeating the steps of receiving and comparing until for each resource request signal, the instruction signal associated therewith has been either suppressed or allocated an execution unit.

* * * * *

UNITED STATES PATENT AND TRADEMARK OFFICE
CERTIFICATE OF CORRECTION

PATENT NO. : 5,689,673

DATED : November 18, 1997

INVENTOR(S) : Takeshi Kitahara

It is certified that error appears in the above-identified patent and that said Letters Patent is hereby corrected as shown below:

Column 8, line 3,

In claim 2, last paragraph, before "resource control circuit coupled" insert --a--.

Signed and Sealed this

Twenty-eighth Day of April, 1998

Attest:

BRUCE LEHMAN

*Attesting Officer*     *Commissioner of Patents and Trademarks*